US009932108B1

(12) United States Patent
Viele

(10) Patent No.: US 9,932,108 B1
(45) Date of Patent: Apr. 3, 2018

(54) FLEXIBLE AND ROBUST COMMUNICATION INTERFACE

(71) Applicant: Kitty Hawk Corporation, Mountain View, CA (US)

(72) Inventor: Brian Robert Viele, Crozet, VA (US)

(73) Assignee: Kitty Hawk Corporation, Mountain View, CA (US)

( * ) Notice: Subject to any disclaimer, the term of this patent is extended or adjusted under 35 U.S.C. 154(b) by 0 days.

(21) Appl. No.: 15/701,228

(22) Filed: Sep. 11, 2017

(51) Int. Cl.
| | |
|---|---|
| B64C 13/00 | (2006.01) |
| B64C 13/02 | (2006.01) |
| B64C 29/00 | (2006.01) |
| H04L 12/26 | (2006.01) |
| H04L 29/08 | (2006.01) |
| H04L 12/403 | (2006.01) |
| H04L 12/707 | (2013.01) |
| H04L 12/40 | (2006.01) |

(52) U.S. Cl.
CPC .......... *B64C 13/02* (2013.01); *B64C 29/0025* (2013.01); *H04L 12/403* (2013.01); *H04L 43/0823* (2013.01); *H04L 45/22* (2013.01); *H04L 67/125* (2013.01); *H04L 2012/4028* (2013.01)

(58) Field of Classification Search
CPC . H04L 67/12; H04L 69/08; H04L 2012/4028; H04L 1/1812; H04L 45/50; H04L 12/403; H04L 43/0823; H04L 45/22; H04L 67/125; G09B 19/16; G09B 9/08; B64C 13/02; B64C 29/0025
See application file for complete search history.

(56) References Cited

U.S. PATENT DOCUMENTS

| | | | | |
|---|---|---|---|---|
| 2009/0287787 | A1* | 11/2009 | Cabaret | G06F 13/387 709/206 |
| 2014/0380001 | A1* | 12/2014 | Schubert | G06F 9/5077 711/153 |
| 2017/0140046 | A1* | 5/2017 | Rose | G06F 17/30864 |
| 2017/0168810 | A1* | 6/2017 | Knijnenburg | G06F 8/65 |

\* cited by examiner

*Primary Examiner* — Jelani A Smith
(74) *Attorney, Agent, or Firm* — Van Pelt, Yi & James LLP

(57) ABSTRACT

A first instruction directed to a first device is received from a controller and via a communication channel with redundancy. The first instruction is sent to the first device via a first communication protocol associated with the first device. A second instruction directed to a second device is received from the controller and via the communication channel with redundancy. The second instruction is sent to the second device via a second communication protocol associated with the second device.

16 Claims, 13 Drawing Sheets

FLEXIBLE AND ROBUST COMMUNICATION INTERFACE

BACKGROUND OF THE INVENTION

When designing an aircraft, the desire for redundancy can sometimes conflict with the desire to reduce a bill of materials and/or cost. New aircraft sub-systems which can balance both redundancy and cost would be desirable.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Various embodiments of a flexible and robust communication interface which is capable of supporting both legacy devices and newer devices (e.g., as/if needed) are described herein. In some embodiments, the communication interface receives, from a controller and via a communication channel with redundancy, a first instruction directed to a first device; the first instruction is sent to the first device via a first communication protocol associated with the first device; a second instruction directed to a second device is received from the controller and via the communication channel with redundancy; the second instruction is sent to the second device via a second communication protocol associated with the second device. In some embodiments, the communication interface is used in an aircraft and sits between a flight controller and one or more sensors, actuators, lift fans, and/or other devices which are controlled by and/or read by the flight controller.

Figure 1:
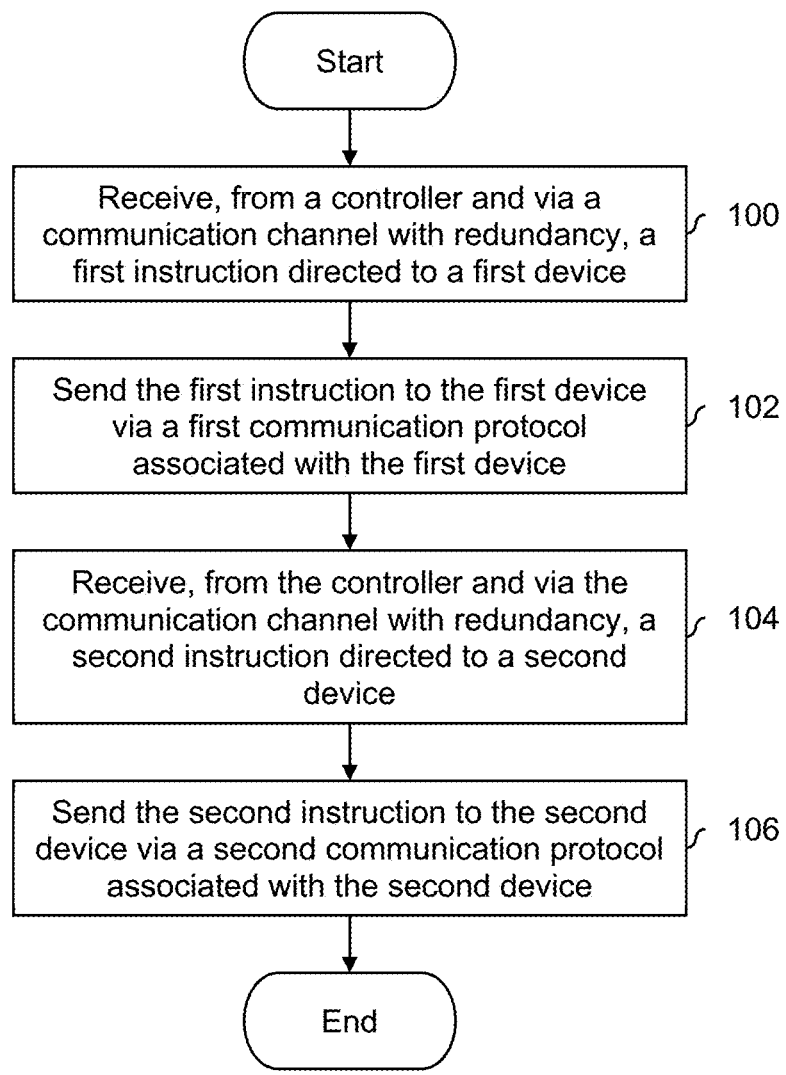
FIG. 1 is a flowchart illustrating an embodiment of a process to communicate via a flexible and robust communication interface.

FIG. 1 is a flowchart illustrating an embodiment of a process to communicate via a flexible and robust communication interface. In one example, the process is used in an aircraft application and a device which performs the process sits between a flight controller and one more devices which are controlled and/or read by the flight controller (e.g., an actuator (e.g., to a flight control surface, a lift fan, etc.), a sensor (e.g., global positioning system (GPS), an inertial measurement unit (IMU), etc.), etc.). In various embodiments, an IMU includes sensors or other equipment which uses inertia to perform their measurements, such as gyroscopes, accelerometers, etc. In some embodiments, a communication interface which performs the process is implemented in a field-programmable gate array (FPGA) and/or an application-specific integrated circuit (ASIC).

At 100, a first instruction directed to a first device is received from a controller and via a communication channel with redundancy. A communication channel with redundancy is one where there are multiple, independent (e.g., logical and/or physical) channels or lines of communication between the controller and a communication interface which receives the first instruction at step 100. The failure of one channel does not automatically mean that the other channel will also fail since the channels are independent of one another. In some embodiments, a communication channel with redundancy includes an Ethernet protocol, such as Spanning Tree Protocol, Parallel Redundancy Protocol, EtherCAT, Modbus, Avionics Full-Duplex Switched Ethernet (AFDX), etc.

At 102, the first instruction is sent to the first device via a first communication protocol associated with the first device. For example, the first device may be a legacy device which communicates via a legacy (e.g., slow) communication protocol, such as ARINC 429, RS-422, Controller Area Network (CAN), serial, or PWM and the first instruction is sent via that communication protocol.

In some embodiments, the communication interface transforms or translates the first instruction received from the controller (e.g., which is formatted or configured for the (e.g., high-speed, redundant, and/or newer) communication channel) into a form that is appropriate for the legacy communication protocol. For example, this might include transparent translation to ARINC-429 labels, CAN Aerospace and/or other aerospace protocols.

At 104, a second instruction directed to a second device is received from the controller and via the communication channel with redundancy. As before with the first device, the second device may be an actuator, a sensor, etc.

At 106, the second instruction is sent to the second device via a second communication protocol associated with the second device. To continue the example from above, while the first device may be a legacy device, the second device may be a non-legacy device which communicates via a faster and/or newer communication protocol. In some embodiments, the second communication protocol associated with the second device is the same high speed, redundant, and/or modern communication protocol that is used between the controller and the communication interface (e.g., EtherCAT, AFDX, etc.).

It may be helpful to give some example applications in order to better understand the process of FIG. 1. The following figures describe some such examples.

Figure 2:
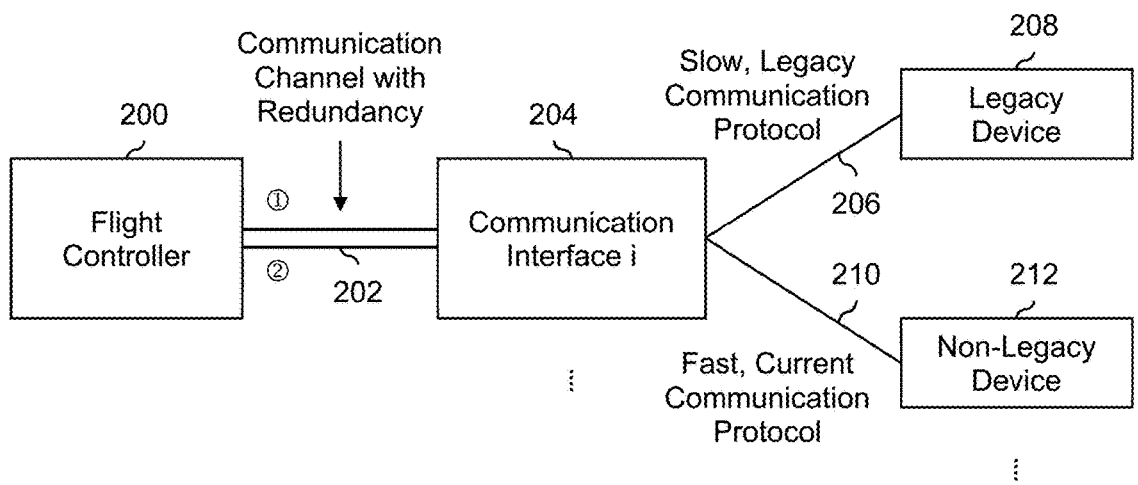
FIG. 2 is a diagram illustrating an embodiment of a communication interface which is used to communicate with a legacy device and a non-legacy device.

FIG. 2 is a diagram illustrating an embodiment of a communication interface which is used to communicate with a legacy device and a non-legacy device. In this example, the process of FIG. 1 is performed by communication interface 204. For example, communication interface 204 receives instructions from flight controller 200 for legacy device 208 and non-legacy device 212 via a communication channel with redundancy (202). In this example, the communication channel with redundancy (202) includes two independent communication channels so that if one channel goes down the other is still available. Instructions for legacy device 208 and non-legacy device 212 are received by communication interface 204 via communication channel 202. For example, if a device is an actuator, then the instruction may be associated with moving or otherwise adjusting the position of the actuator.

In this example, the communication interface (204) communicates with a legacy device (208) via a slow, legacy communication protocol (206). Some examples include ARINC 429, Controller Area Network (CAN), serial, PWM, SDLC/HDLC, SPI, RS-232/422/485, USB, etc. For example, these relatively slow legacy communication protocols communicate at data rates on the order of tens or hundreds of kilobytes per second.

In contrast, non-legacy device (212) is communicated with via a fast and current communication protocol (210), for example, with data rates on the order of hundreds of megabytes per second. In some embodiments, communication protocol 210 includes an Ethernet protocol with redundancy, such as EtherCAT or AFDX. In some embodiments, the same communication protocol is used in communication channel 202 (e.g., between flight controller 200 and communication interface 204) as in communication protocol 210. For example, the non-legacy device (212) may be designed in-house by an aircraft manufacturer (e.g., it is a custom lift fan or custom actuator) and the device is specifically designed to support the same protocol as communication channel 202.

One benefit of the communication technique described herein is that it is flexible because it can be used to communicate with a variety of devices which use a variety of communication protocols of varying ages. For example, in aircraft applications, some of the components may be newly designed components which are designed in-house (e.g., non-legacy device 212), whereas other components are existing third-party or off-the-shelf devices (e.g., legacy device 208) which use slow and/or legacy communication protocols. For example, an all-electric aircraft may have all new lift fans (e.g., which are communicated with using faster and/or newer communication protocols) but other components (e.g., actuators for flight control surfaces or sensors such as IMUs) may have been in use for decades with slow and/or archaic communication protocols. This communication technique permits the use of both new and quite old parts.

Another benefit is that the number of components and/or cost of the system may be reduced while still providing at least some redundancy. For example, legacy device 208 may require the purchase of expensive licenses and/or components (e.g., FPGAs/ASICs) which are designed to communicate over legacy communication protocol 206. Suppose instead that there was no communication interface (204). In an aircraft application where redundancy is important, this would require the purchase of two FPGAs/ASICs which would be included in flight controller 200 in order to support two independent communication channels between the flight controller and the legacy device. With the configuration shown here, if desired, only single expensive FPGAs/ASICs (e.g., to support the legacy communication protocol) are purchased and included in communication interface 204. This balances cost with redundancy because there is still redundancy over communication channel 202.

Another benefit is the ability to partition buses to areas where they are applicable, while having a single "backbone" network around the aircraft running over a high-speed, low latency, and robust connection (e.g., Ethernet over fiber optics around the entire aircraft, with small localized low-speed copper based networks in areas where appropriate). This provides benefits for signal integrity, weight, and/or allows for multiple low-bandwidth networks to be aggregated onto the high bandwidth network (e.g., have something like 10× fully utilized 500 kbps CAN networks around the aircraft, which could not exist on a single CAN network, but can all be aggregated onto such a high speed network).

Another benefit is the ability to provide device abstraction. For example, the communication would be defined by configuration of the communication modules (e.g., a servo is attached to some CAN bus and uses some protocol to communicate). The device would then know from this configuration how to communicate with the servo, and the flight system could simply send a servo command to this module, and it would handle the rest. If it were decided to change servos to one that is (as an example) ARINC429 instead, this would simply require a change of the configuration of the communication module to state that the servo is now connected to ARINC429 and any protocol configuration, and to the flight control system, it is completely transparent (e.g., to the flight controller).

In some embodiments, communication interface 204 is implemented as an FPGA and/or an ASIC. Since FPGAs are programmable, in some embodiments, a given FPGA is only programmed with the communication protocols that FPGA needs to support (e.g., depending upon what devices the communication interface is connected to). In some embodiments, there are multiple communication interfaces, each of which communicates and/or interfaces with its own set of devices.

The following figure shows an example where multiple communication interfaces are used to communicate with various devices in an aircraft.

Figure 3:
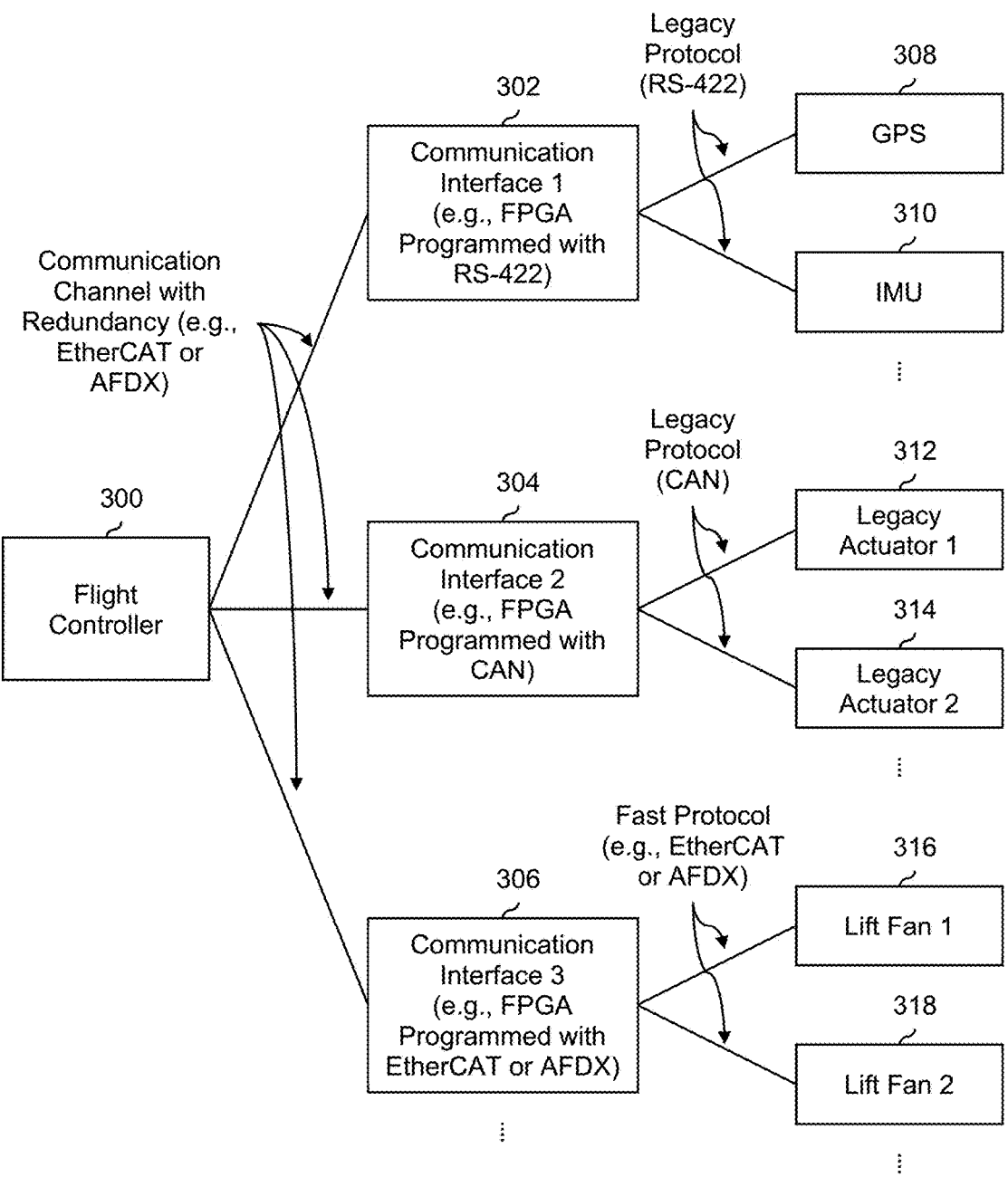
FIG. 3 is a diagram illustrating an embodiment of multiple communication interfaces which are used to communicate with various devices.

FIG. 3 is a diagram illustrating an embodiment of multiple communication interfaces which are used to communicate with various devices. In this example, flight controller (300) communicates with three communication interfaces (302, 304, and 306). The first communication interface (302) is coupled to GPS 308 and IMU 310. In this example, both of those devices use a legacy communication protocol (specifically, RS-422 in this example) and so communication interface 302 is configured to support that communication protocol. In some embodiments, other communication protocols which that communication interface does not need to support (e.g., CAN) are not included or programmed into communication interface 302. For example, communication interface 302 may be an FPGA programmed to support RS-422 but not necessarily CAN. As described above, in some embodiments, only single license or proprietary FPGA/ASIC to support RS-422 communication is obtained for communication interface 302 in order to keep costs down.

The second communication interface (304) is coupled to legacy actuators 312 and 314. For example, these actuators could be coupled or connected to control surfaces, propulsion motors, engine and/or motor throttles, etc. In this example, a legacy communication protocol (specifically, CAN in this example) is used to communicate with legacy actuators. In some embodiments, the second communication interface (304) is an FPGA programmed with and/or configured to support CAN.

Returning briefly to FIG. 1, in one example, steps 100 and 102 are performed by the first communication interface (302) and steps 104 and 106 are performed by the second communication interface (304). In other words, the process of FIG. 1 may be performed by multiple communication interfaces as shown here.

The third communication interface (306) is coupled to lift fans 316 and 318. In this example, the lift fans are newly designed and are configured to support the same high-speed communication protocol as that used between the flight controller (300) and the communication interfaces (302, 304, and 306). In some embodiments, EtherCAT or AFDX is used and communication interface 306 is programmed and/or configured with EtherCAT or AFDX.

The following figure shows an example of an aircraft which uses the communication interface described herein.

Figure 4:
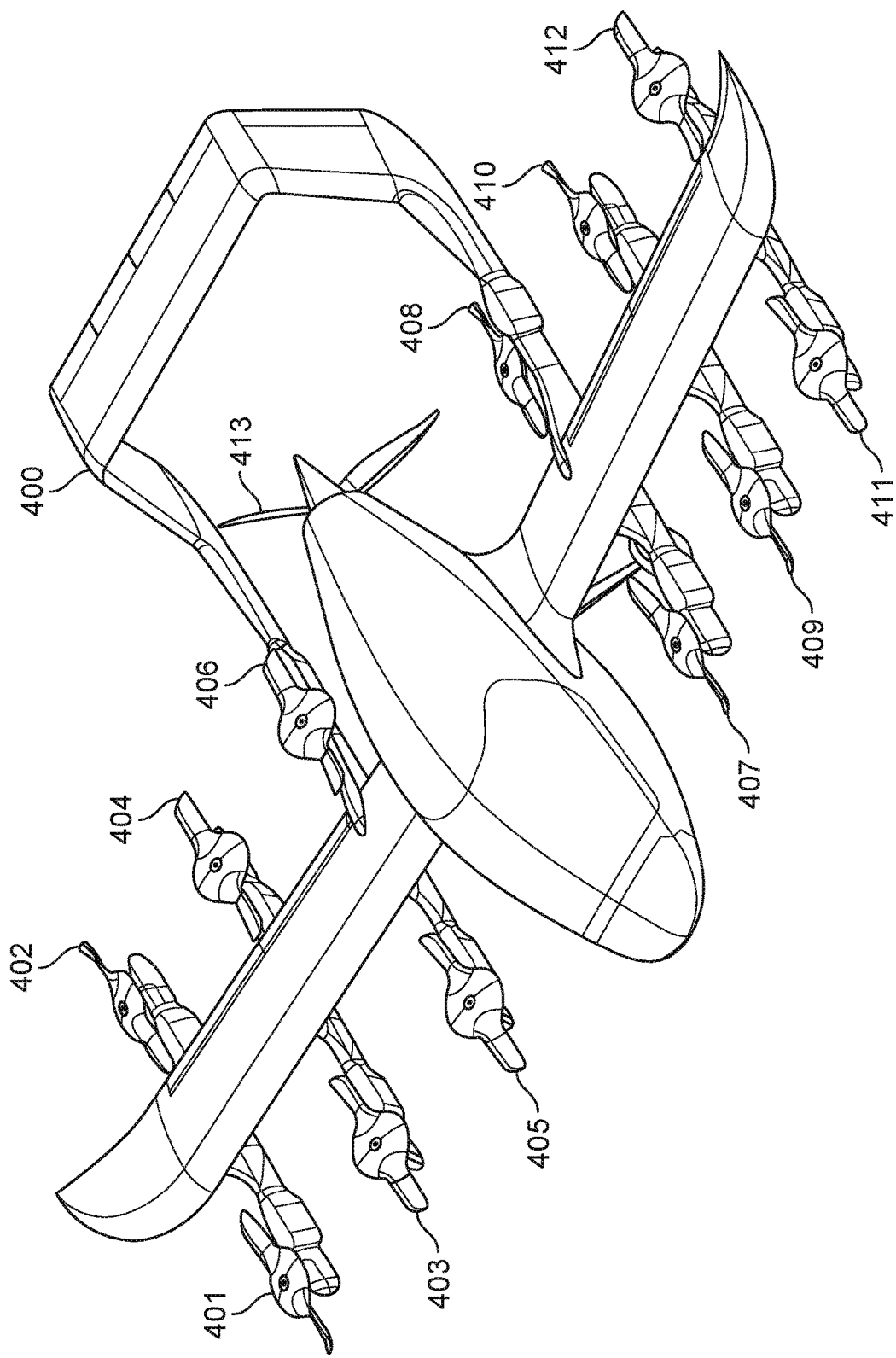
FIG. 4 is a diagram illustrating an embodiment of an aircraft which uses a communication interface to communicate with various devices in the aircraft.

FIG. 4 is a diagram illustrating an embodiment of an aircraft which uses a communication interface to communicate with various devices in the aircraft. In this example, an all-electric aircraft (400) is shown with vertical takeoff and landing (VTOL) lift fans (401-412), which are configured to rotate about a vertical axis of rotation, and a single forward flight lift fan (413), which is configured to rotate about a longitudinal axis of rotation. The lift fans are sometimes referred to as rotors or propellers. As the names of the lift fans imply, the exemplary multicopter is able to perform vertical takeoffs and landings and also fly in a forward manner (e.g., fly forward at a generally constant altitude). During the vertical takeoff and landing mode, VTOL lift fans 401-412 are on and forward flight lift fan 413 is off. Once a desired altitude is reached, the aircraft transitions to a forward flight mode, where the multicopter's altitude is expected to change very little (e.g., the multicopter cruises and/or flies forward at a relatively fixed altitude). In the forward flight mode, the VTOL lift fans 401-412 are turned off and forward flight lift fan 413 is turned on. To reduce drag, the VTOL lift fans are stopped in the position shown with one blade point forward and the other pointing backward.

The aircraft also includes sensors such as IMU, GPS, AGL, Radar, Lidar, etc. (not shown). In various embodiments, such (e.g., end) devices may be grouped with a shared communication interface to either benefit harnessing by bridging to a localized network to provide physical benefits and/or the buses may be organized by function to allow abstraction of the functional devices (e.g., send a servo command to one of communication interfaces and it knows, based on configuration, how to relay this command onto the devices. This latter design choice would, for example, enable fewer protocols to be programmed per communication interface, which would make them smaller and/or cheaper (e.g., because fewer expensive IP or licenses need to be acquired). If the (e.g., end) devices change physical medium (e.g., ARINC429 to CAN), the configuration can be changed as needed and the software in the flight control system would not need to be changed and/or updated at all, making the change transparent to the flight controller.

As described above, in some embodiments, a communication channel with redundancy (e.g., between a flight controller and one or more communication interfaces) uses EtherCAT or AFDX. The following figures show examples of this.

Figure 5:
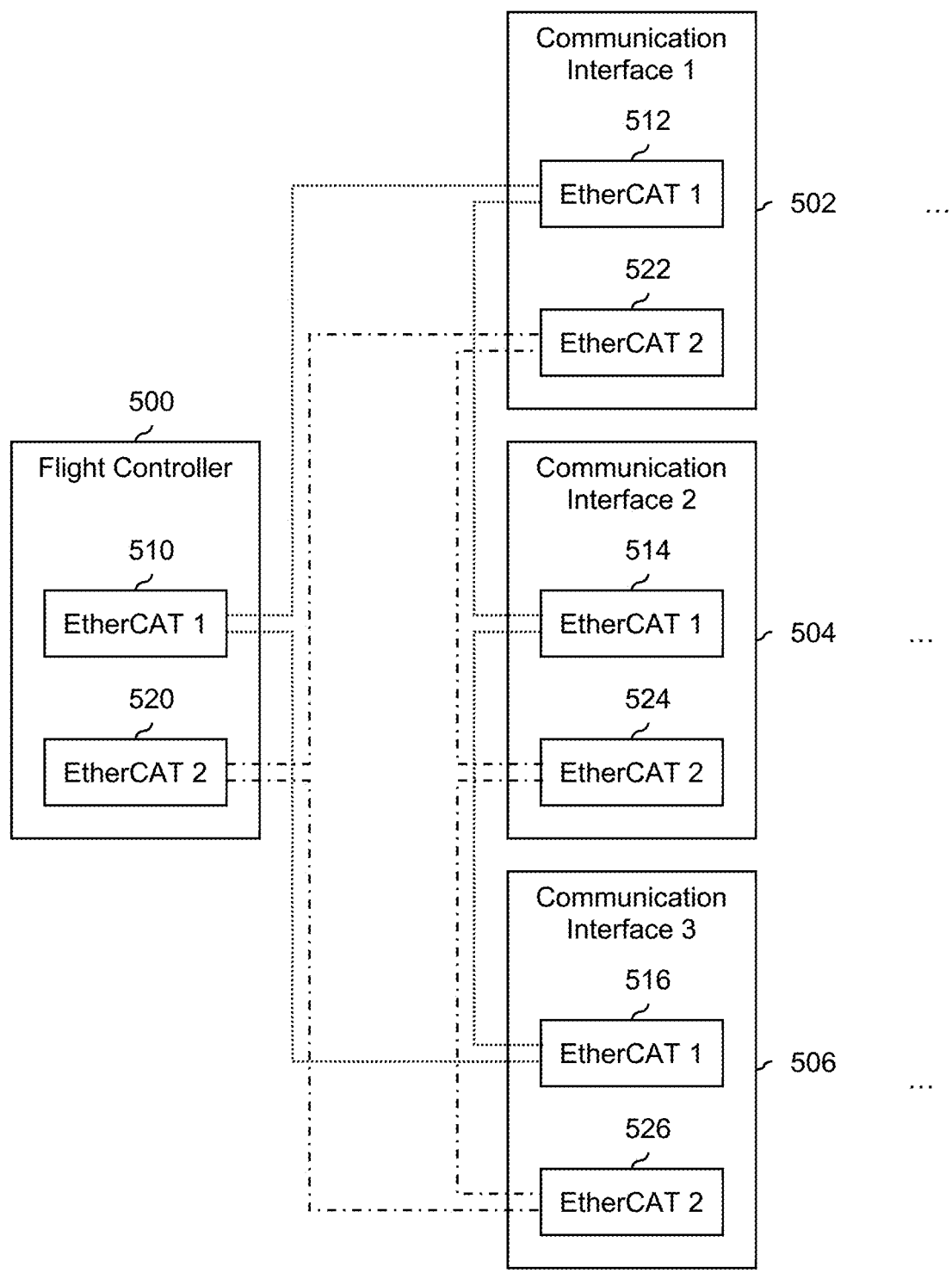
FIG. 5 is a diagram illustrating an embodiment of a communication interface which includes EtherCAT.

FIG. 5 is a diagram illustrating an embodiment of a communication interface which includes EtherCAT. In the example shown, the communication channel between the flight controller (500) and the communication interfaces (502, 504, and 506) uses EtherCAT. For clarity, the first EtherCAT channel or signal is shown with a dotted line and the second EtherCAT channel or signal is shown with a dashed and dotted line.

As shown here, the EtherCAT-implemented communication channel between the flight controller (500) and communication interfaces (502, 504, and 506) includes two daisy chain connections. The first daisy chain includes EtherCAT 1 block 510 in flight controller 500, EtherCAT 1 block 512 in first communication interface 502, EtherCAT 1 block 514 in second communication interface 504, and EtherCAT 1 block 516 in third communication interface 506. The second daisy chain includes EtherCAT 2 block 520 in flight controller 500, EtherCAT 2 block 522 in first communication interface 502, EtherCAT 2 block 524 in second communication interface 504, and EtherCAT 2 block 526 in third communication interface 506. If one daisy chain fails, then the other daisy chain can be used.

In some embodiments, a communication protocol or channel between a communication interface and a non-legacy device (e.g., lift fan, actuator, sensor, etc.) also uses EtherCAT and that protocol or channel may be similarly connected. See, for example, the protocol or channel between communication interface 306 and lift fans 316 and 318 in FIG. 3.

Figure 6:
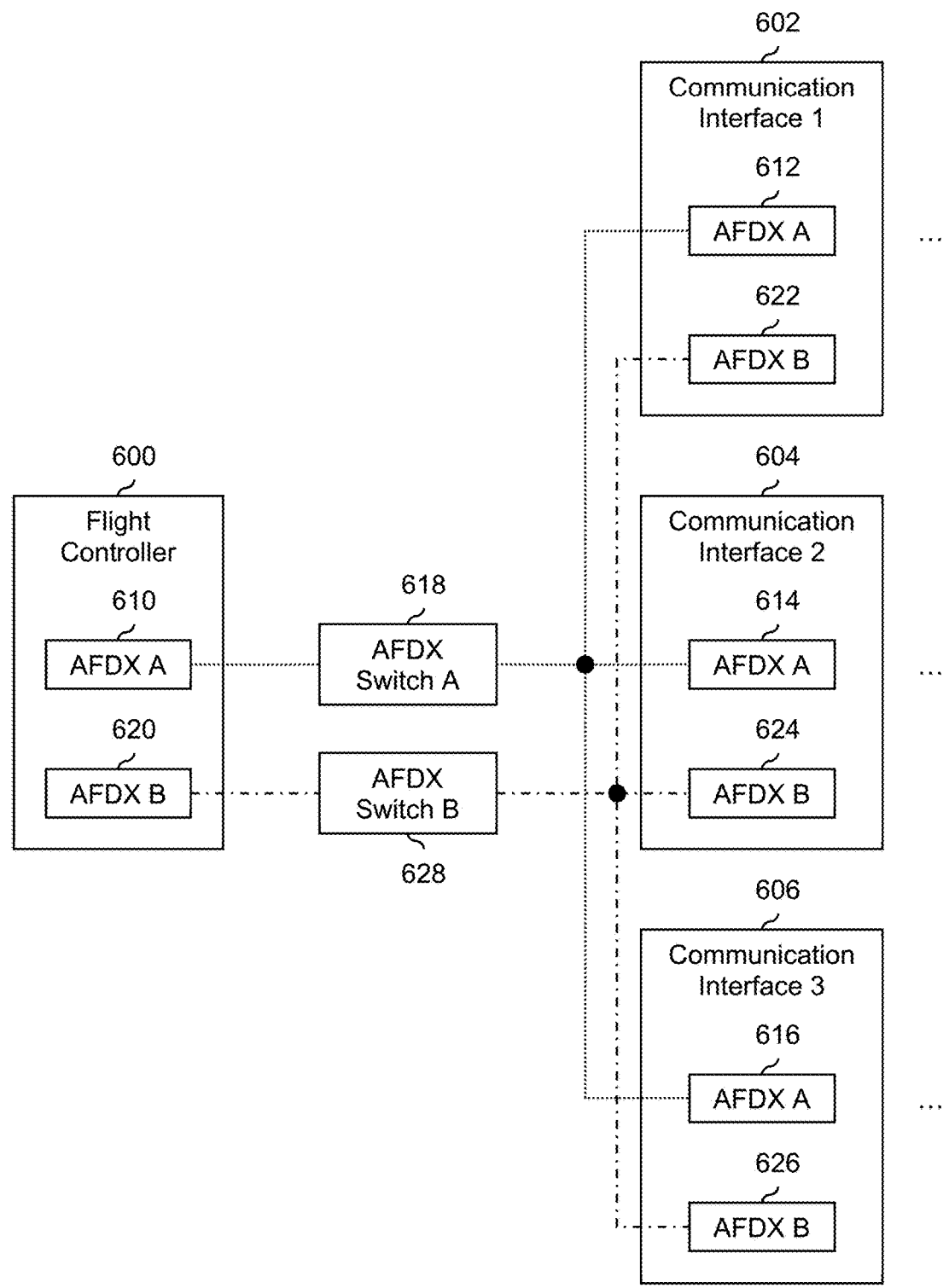
FIG. 6 is a diagram illustrating an embodiment of a communication interface which includes Avionics Full-Duplex Switched Ethernet (AFDX).

FIG. 6 is a diagram illustrating an embodiment of a communication interface which includes Avionics Full-Duplex Switched Ethernet (AFDX). In the example shown, the communication channel between the flight controller (600) and the communication interfaces (602, 604, and 606) uses AFDX. For clarity, the first AFDX channel or signal is shown with a dotted line and the second AFDX channel or signal is shown with a dashed and dotted line.

In this example, two switches (618 and 628) sit between the flight controller (600) and communication interfaces (602, 604, and 606), one for each independent channel or signal. AFDX A block 610 in flight controller 600 is connected to AFDX switch A (618). In turn, that switch (618) is connected to AFDX A blocks 612, 614, and 616 in communication interfaces 602, 604, and 606 (respectively). Similarly, AFDX B block 620 in flight controller 600 is connected to AFDX switch B (628) which in turn is connected to AFDX B blocks 622, 624, and 626 in communication interfaces 602, 604, and 606 (respectively).

Other parts of the system which similarly use AFDX (e.g., a communication protocol or channel between a communication interface and a non-legacy device) may be connected in a similar manner. See, for example, the protocol or channel between communication interface 306 and lift fans 316 and 318 in FIG. 3.

In some embodiments, a communication interface does not merely act as a translator or interface between two different communication protocols, but also supplements the carried content with its own content. The following figures illustrate some examples of this.

Figure 7:
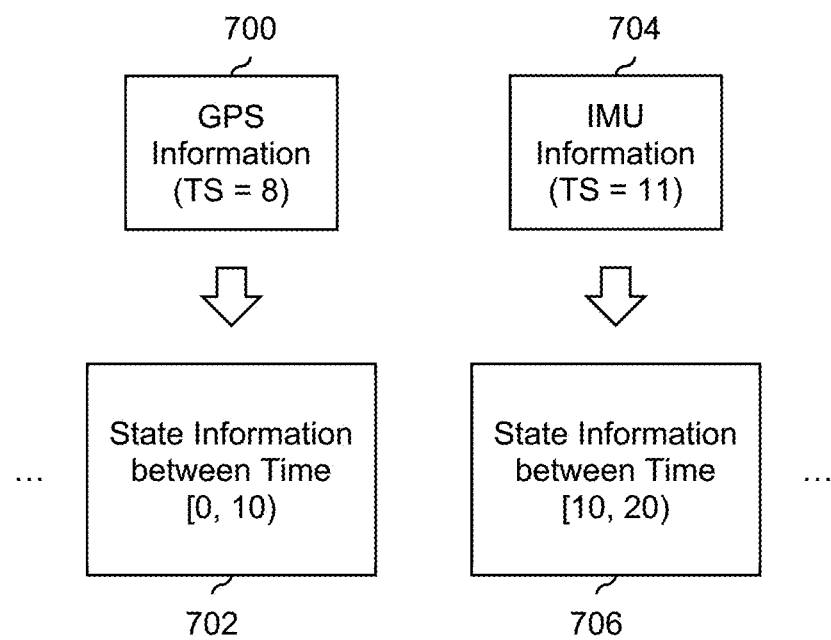
FIG. 7 is a diagram illustrating an embodiment of sensor information which is assigned to different groups of sensor data based on their timestamps.

FIG. 7 is a diagram illustrating an embodiment of sensor information which is assigned to different groups of sensor data based on their timestamps. In the example shown, state information from two sensors is received at and processed by a flight controller (not shown): state information from a GPS device and state information from an IMU device. GPS information 700 has a timestamp of 8 associated with it. For example, a communication interface (not shown) which received that piece of state information may have associated that timestamp with that piece of GPS (or, more generally, state) information.

Similarly, IMU information 704 has a timestamp associated with it, but its value is 11. In the example of FIG. 3, the same communication interface (302) is connected to the GPS (308) and IMU (310) and so the same communication interface would have marked state 700 and 704 with a same timestamp. Alternatively, two different communication interfaces may be connected to the GPS and IMU and those respective communication interfaces may have assigned the timestamps to pieces of state information.

Using the timestamps, the pieces of state information (700 and 704) are assigned to the appropriate bin of state information. In this example, bin 702 is for state information with a timestamp in the range of [0, 10) and bin 706 is for state information with a timestamp in the range of [10, 20). GPS information 700 has a timestamp that falls within the range associated with bin 702, so that piece of state information is assigned to that bin. IMU information 704 has a timestamp that falls within the range associated with bin 706, so that piece of state information is assigned to that bin.

With the state information assigned to the correct bin or group, the flight controller (not shown) determines a next set of instructions for the aircraft. For example, in FIG. 4, the instructions may include torqueing up or down the rotors shown there, adjusting the position of any flight control surfaces (e.g., wing flaps) via an actuator, etc.

In some cases, differences in the communication latencies may mean that different pieces of state information arrive at the flight controller at different times. For example, state information which is exchanged or conveyed using a faster, modern communication protocol may arrive more quickly than state information which is exchanged or conveyed using a slower legacy protocol. Or, if a message was garbled or error-filled (e.g., between a device and its communication interface), the message may have to be retransmitted, causing the message to arrive late. By assigning a timestamp to the various pieces of state information, the state information can be better correlated with each other (e.g., the flight controller knows which pieces of state information are from the same period or window of time) so that the flight controller has a more accurate picture of the current state of the aircraft and can make better decisions.

The following figure describes this more generally and/or formally in a flowchart.

Figure 8:
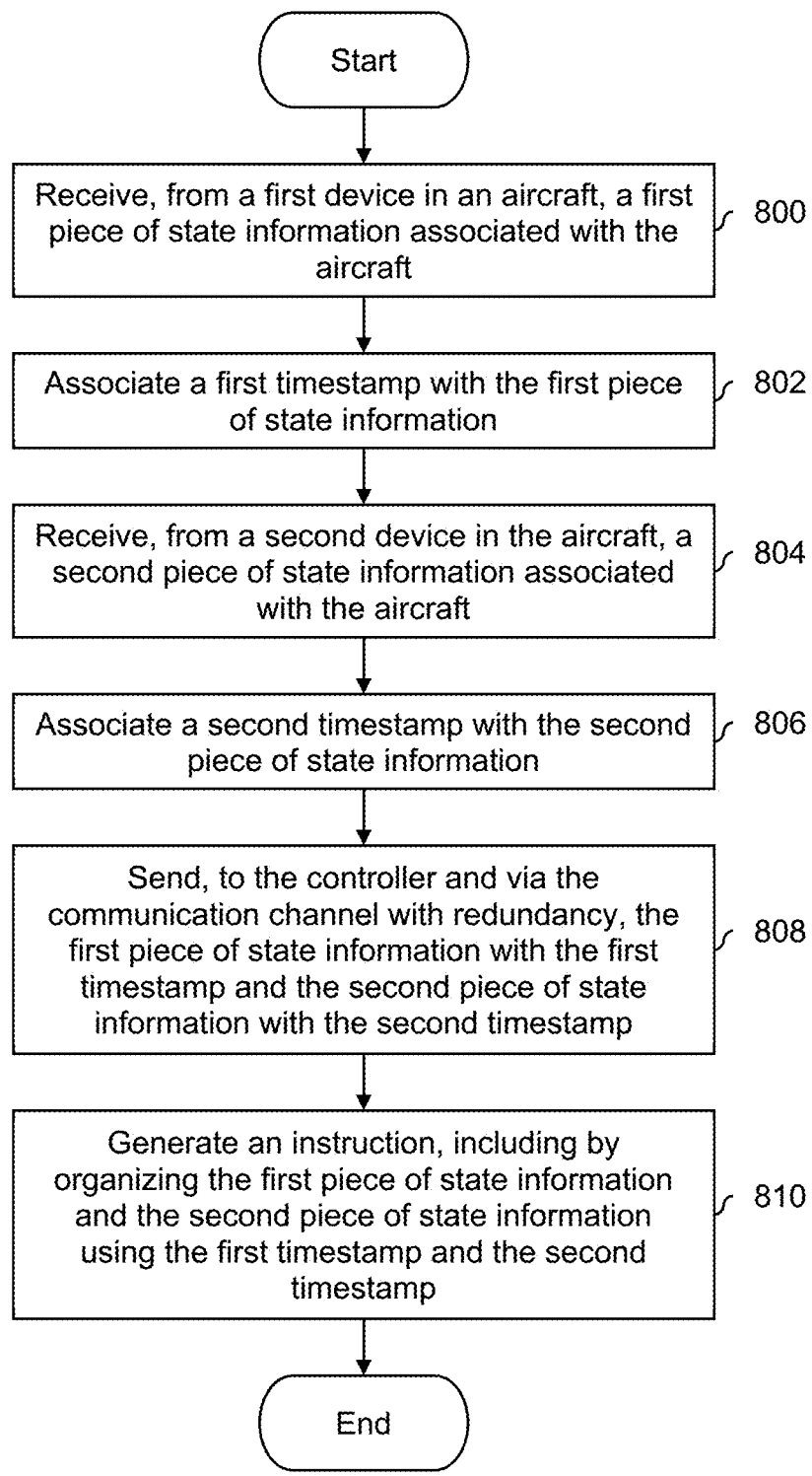
FIG. 8 is a flowchart illustrating an embodiment of a process to generate an instruction using timestamps.

FIG. 8 is a flowchart illustrating an embodiment of a process to generate an instruction using timestamps. In some embodiments, the process is performed by one or more communication interfaces (see, e.g., FIG. 3, FIG. 5, and FIG. 6). In some embodiments, the process of FIG. 8 is performed in combination with the process of FIG. 1.

At 800, a first piece of state information associated with an aircraft is received from a first device in the aircraft. For example, GPS information 700 in FIG. 7 shows an example of a first piece of state information. In FIG. 3, communication interface 302 illustrates an example of a device which receives a first piece of state information at step 800.

At 802, a first timestamp is associated with the first piece of state information. For example, communication interface 302 in FIG. 3 may have assigned a timestamp of 8 with GPS information 700 in FIG. 7.

At 804, a second piece of state information associated with the aircraft is received from a second device in the aircraft. For example, IMU information 704 in FIG. 7 shows an example of a second piece of state information. Communication interface 302 in FIG. 3 shows an example of a device that receives a second piece of state information (e.g., from IMU 310) at step 804.

At 806, a second timestamp is associated with the second piece of state information. See, for example IMU information 704 in FIG. 7 which has a timestamp of 11. That association between the timestamp and the state information may have been done by communication interface 302 in FIG. 3.

At 808, the first piece of state information with the first timestamp and the second piece of state information with the second timestamp are sent to the controller and via the communication channel with redundancy. For example, in FIG. 3, the exchange at step 808 may have occurred between communication interface 302 and flight controller 300.

At 810, an instruction is generated, including by organizing the first piece of state information and the second piece of state information using the first timestamp and the second timestamp. In FIG. 7, for example, the organization includes assigning the pieces of state information to an appropriate bin or group of state information based on the timestamps. In the example of FIG. 4, the instruction may relate to controlling or otherwise adjusting one of the lift fans shown there, a flight control surface (e.g., a wing flap) via an actuator, etc.

In some embodiments, a message which contains state information is garbled and/or error-filled and needs to be retransmitted. For example, suppose that GPS information is garbled between GPS 308 and communication interface 302 in FIG. 3 and so the GPS information is retransmitted. In some embodiments, to get a more accurate timestamp, a timestamp associated with the start of a message is noted or otherwise saved, even if that message is garbled or error prone. Once an error-free version of that message and/or that state information is received, the saved timestamp (e.g., when the garbled, first attempt was received or was started to be received) is associated with the state information. This may enable more accurate timestamps to be associated with the state information, even if there is a retransmission.

Figure 9:
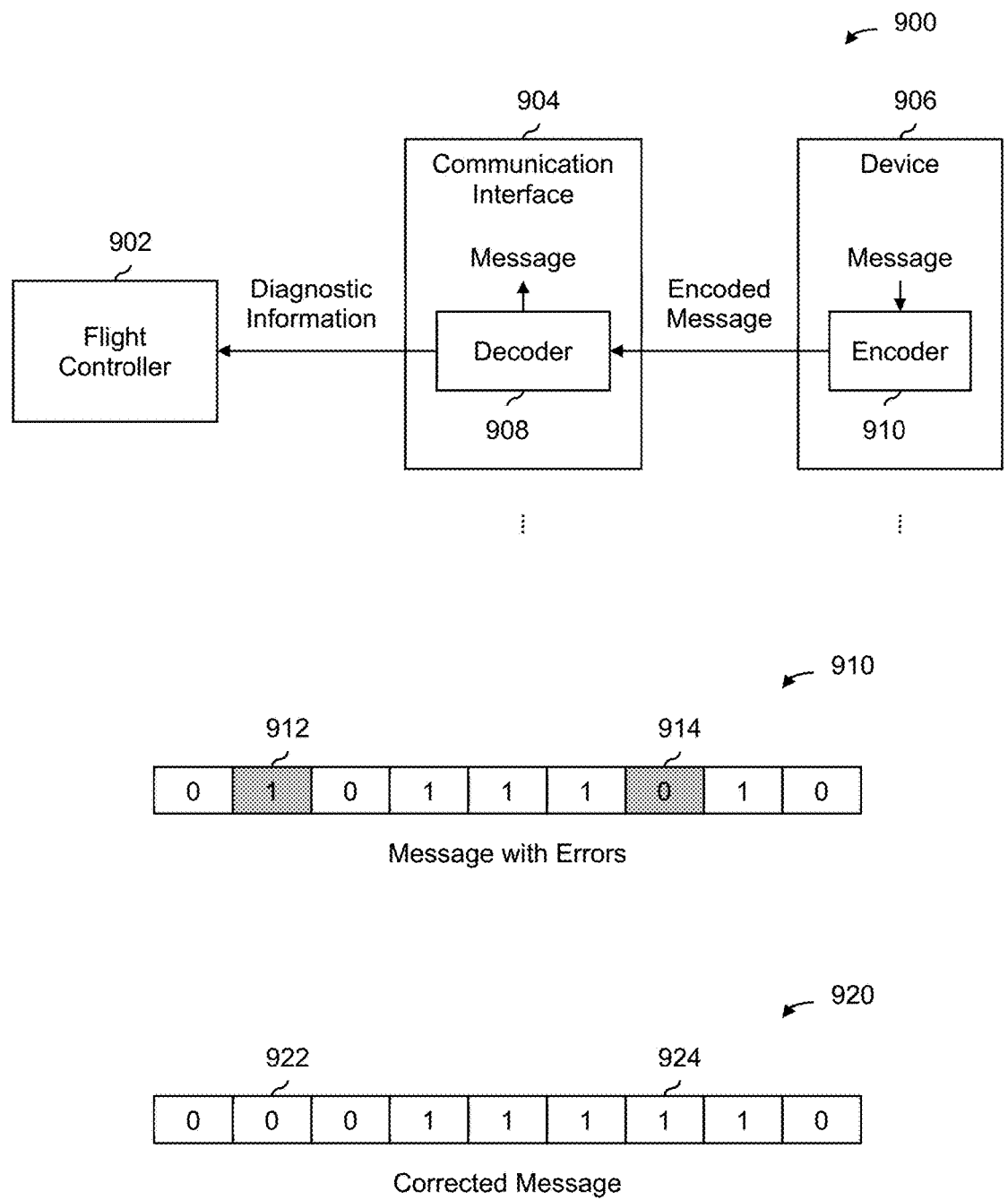
FIG. 9 is a diagram illustrating an embodiment of a communication interface which generates diagnostic information which includes a number of errors in an encoded message.

FIG. 9 is a diagram illustrating an embodiment of a communication interface which generates diagnostic information which includes a number of errors in an encoded message. In the example shown, diagram 900 shows a communication protocol between a communication interface (904) and device (906) which uses a code to exchange messages. In some embodiments, the code is an error detection code, which is able to detect the presence of errors in a message (but not necessarily correct the detected errors if there are three or more possible symbols per position). In some embodiments, the code is an error correction code which is able to both detect and correct errors in the message (e.g., assume there are not too many errors).

In this example, the device (906) has a message to send to the communication interface. The message is encoded using encoder 910 to obtain an encoded message. The encoded message is then sent from device 906 to communication interface 904 where it is decoded using decoder 908. Assuming there are not too many errors (i.e., any errors are within the error detection/correction capability of the code), the original message is obtained at communication interface 904.

Diagram 910 shows an example of a message with errors. In that example bit sequence, the bit in location 912 and the bit in location 914 have errors. Diagram 920 shows the corrected message with the bits in location 912 and 914 "flipped" to correct those values. As shown here, with a binary sequence (i.e., only 0s and 1s), error detection and error correction overlap since there is only one other possible value once an error has been located or otherwise detected.

In this example, communication interface 904 sends diagnostic information to flight controller 902 where the diagnostic information is based on or otherwise includes a number of errors associated with the encoded message exchanged between device 906 and communication interface 904. For example, for the message shown in diagram 910 and 920, the diagnostic information would indicate that two errors were found in the message.

This diagnostic information may enable maintenance to be performed on device 906 and/or on a connection to device 906 before any component actually fails. For example, if the diagnostic information indicates a large number of errors, the pilot may be notified to bring the aircraft in for maintenance and a mechanic may examine device 906 and/or a connection to device 906 more closely to determine if replacement and/or repair is needed. The diagnostic information may be recorded or otherwise saved for the use of the mechanic, for example, so that a mechanic knows more precisely where in the aircraft to look for problems.

The following figure describes this example more generally and/or formally in a flowchart.

Figure 10:
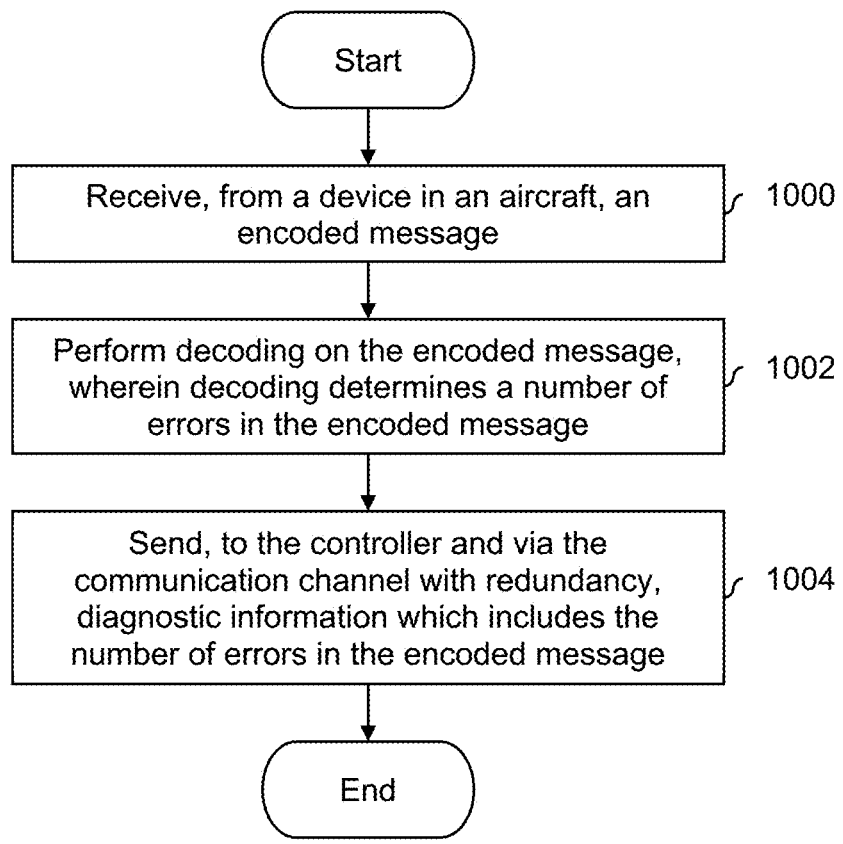
FIG. 10 is a flowchart illustrating an embodiment of a process to generate diagnostic information which includes a number of errors in an encoded message.

FIG. 10 is a flowchart illustrating an embodiment of a process to generate diagnostic information which includes a number of errors in an encoded message. In some embodiments, the process is performed in combination with any number of the previous processes.

At 1000, an encoded message is received from a device in an aircraft. For example, in FIG. 9, this step is performed by communication interface 904 which receives an encoded message from device 906.

At 1002, decoding is performed on the encoded message, wherein decoding determines a number of errors in the encoded message. As described above, the decoded message may include error detection decoded or error correction decoding. In some embodiments, an encoded message includes payload information as well as a checksum or parity where the checksum or parity is used to detect errors in the payload information. In the example of FIG. 9, two errors are detected and corrected.

At 1004, diagnostic information which includes the number of errors in the encoded message is sent to the controller and via the communication channel with redundancy. For example, in FIG. 9, communication interface 904 sends diagnostic information to flight controller 902. As described above, this diagnostic information may be used to trigger a maintenance check of the aircraft and/or more precisely identify where in the aircraft to examine.

In some embodiments, a few errors in an encoded message is acceptable and/or somewhat routine such that a maintenance check is not necessarily warranted. The following figures illustrate some examples where a reporting threshold is used.

Figure 11:
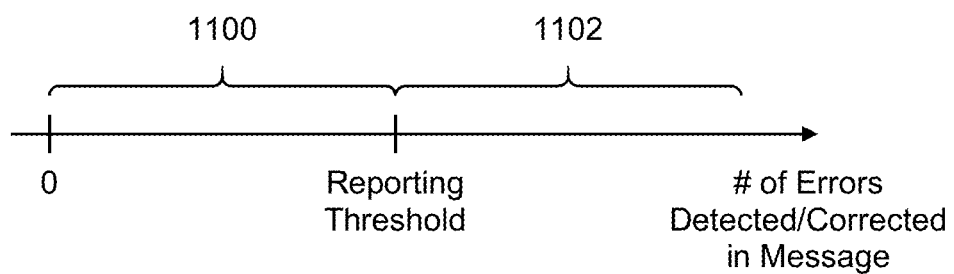
FIG. 11 is a diagram illustrating an embodiment of a reporting threshold. In the example shown, an axis shows a number of errors detected and/or corrected in a message.

FIG. 11 is a diagram illustrating an embodiment of a reporting threshold. In the example shown, an axis shows a number of errors detected and/or corrected in a message. See, for example, FIG. 9 where two bits and/or locations had errors. A reporting threshold is used to decide when/if to report diagnostic information. If the number of errors in the message does not exceed the reporting threshold (e.g., range 1100 between 0 and the reporting threshold), then the errors are not reported and/or no action is taken on the reported information. For example, a few bit errors may occasionally pop up in encoded messages and they are not strongly indicative of an issue or pending failure. Since it may be inconvenient for the pilot to take the aircraft in for maintenance, no action is taken and/or no reporting of diagnostic information or errors is done.

If the number of errors in the message does exceed the reporting threshold (e.g., range 1102 from the reporting threshold on upwards), then the diagnostic information is reported and/or a maintenance check is triggered. A larger number of errors may be more predictive or indicative of an issue or pending failure.

A reporting threshold may be used in a variety of locations throughout the system. For example, the reporting threshold may be used at communication interface 904 where the communication interface uses it to decide when to send diagnostic information to flight controller 902 with non-zero numbers of errors. Alternatively, the reporting threshold may be used at flight controller 902. Communication interface 904 in that configuration would report all numbers of errors (e.g., include only one or two errors) and flight controller 902 would use the reporting threshold to decide when to indicate a maintenance check of the aircraft to the pilot. The following figures describe this more formally and/or generally in a flowchart.

Figure 12:
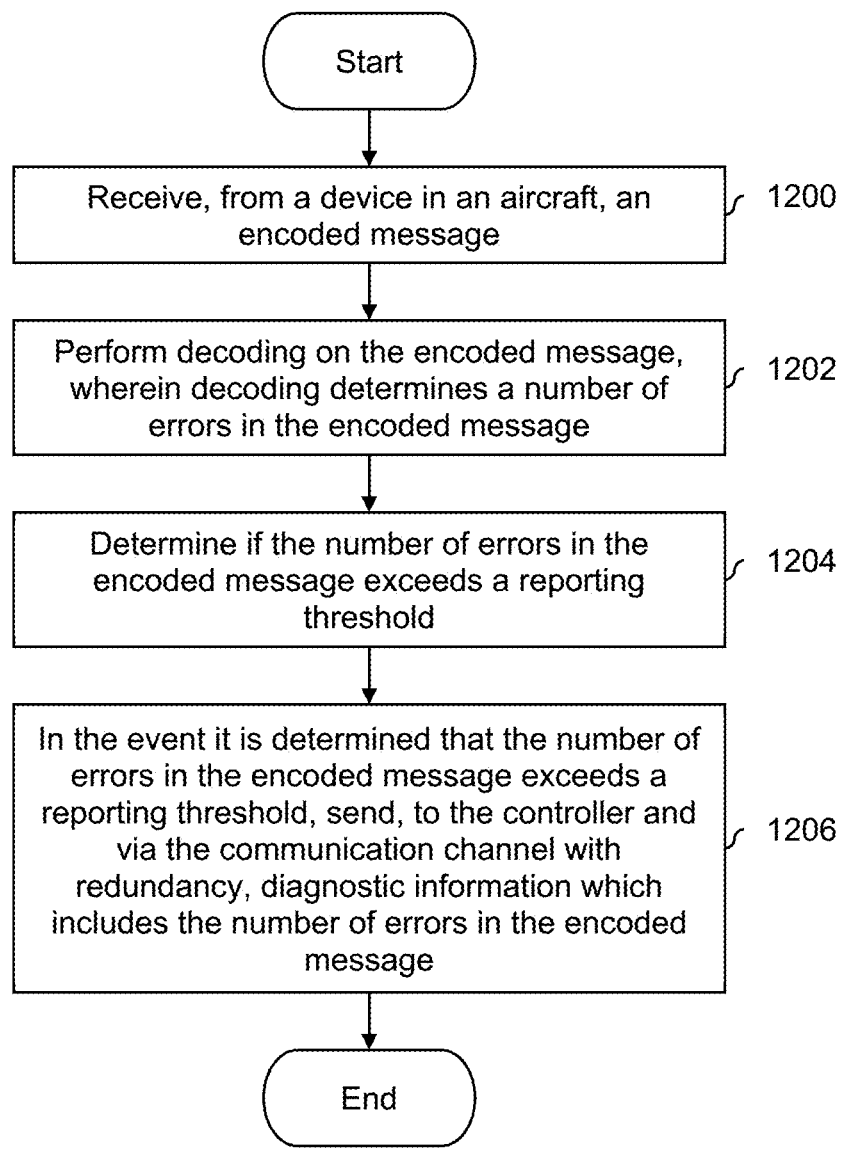
FIG. 12 is a flowchart illustrating an embodiment of a process to generate diagnostic information where a communication interface has a reporting threshold.

FIG. 12 is a flowchart illustrating an embodiment of a process to generate diagnostic information where a communication interface has a reporting threshold. In some embodiments, the process is performed in combination with any number of the previous processes. In this example, a reporting threshold is used at a communication interface.

At 1200, an encoded message is received from a device in an aircraft. See, for example FIG. 9.

At 1202, decoding is performed on the encoded message, wherein decoding determines a number of errors in the encoded message. See, for example FIG. 9.

At 1204, it is determined if the number of errors in the encoded message exceeds a reporting threshold. For example, in FIG. 9, this step would be performed by communication interface 902.

At 1206, in the event it is determined that the number of errors in the encoded message exceeds a reporting threshold, diagnostic information which includes the number of errors in the encoded message is sent to the controller and via the communication channel with redundancy. In other words, the controller is not notified about small numbers of errors (e.g., less than the reporting threshold).

Alternatively, if the number of errors does not exceed the reporting threshold, then no diagnostic information may be sent to the controller at all. Or, diagnostic information is sent to the controller, but the diagnostic information reports that there were no errors.

Figure 13:
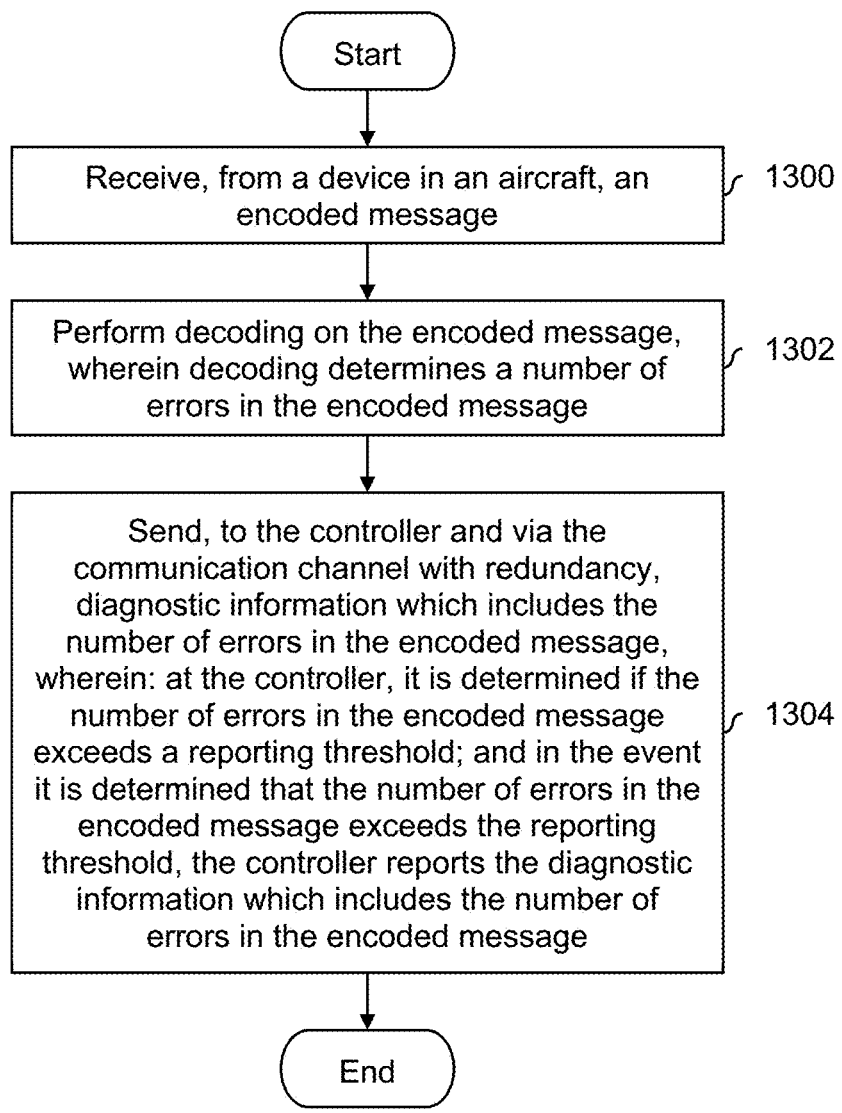
FIG. 13 is a flowchart illustrating an embodiment of a process to generate diagnostic information where a flight controller has a reporting threshold.

FIG. 13 is a flowchart illustrating an embodiment of a process to generate diagnostic information where a flight controller has a reporting threshold. In some embodiments, the process is performed in combination with any number of the previous processes. In this example, a reporting threshold is used at a controller.

At 1300, an encoded message is received from a device in an aircraft. At 1302, decoding is performed on the encoded message, wherein decoding determines a number of errors in the encoded message. For example, in FIG. 9, steps 1300 and 1302 would be performed by communication interface 904 and/or decoder 908.

At 1304, diagnostic information which includes the number of errors in the encoded message is sent to the controller and via the communication channel with redundancy, wherein: at the controller, it is determined if the number of errors in the encoded message exceeds a reporting threshold; and in the event it is determined that the number of errors in the encoded message exceeds the reporting threshold, the controller reports the diagnostic information which includes the number of errors in the encoded message. For example, in FIG. 9, flight controller 902 uses the reporting threshold to decide whether to indicate that a maintenance check should be performed.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor; and
a memory coupled with the processor, wherein the memory is configured to provide the processor with instructions which when executed cause the processor to:
receive, from a controller and via a communication channel with redundancy, a first instruction directed to a first device;
send the first instruction to the first device via a first communication protocol associated with the first device;
receive, from the controller and via the communication channel with redundancy, a second instruction directed to a second device; and
send the second instruction to the second device via a second communication protocol associated with the second device;
wherein: the first device includes a vertical takeoff and landing lift fan which is configured to rotate about a vertical axis of rotation, is configured to rotate during a vertical takeoff and landing mode, and is configured to be stopped during a forward flight mode; and the second device includes a forward flight lift fan which is configured to rotate about a longitudinal axis of rotation, is configured to be stopped during the vertical takeoff and landing mode, and is configured to rotate during the forward flight mode.

2. The system recited in claim 1, wherein the first communication protocol includes one or is more of the following: ARINC 429, RS-422, Controller Area Network (CAN), serial, PWM, SDLC/HDLC, SPI, RS-232/422/485, or USB.

3. The system recited in claim 1, wherein the second communication protocol includes one or more of the following: an Ethernet protocol, Spanning Tree Protocol, Parallel Redundancy Protocol, EtherCAT, Modbus, or Avionics Full-Duplex Switched Ethernet (AFDX).

4. The system recited in claim 1, wherein the communication channel with redundancy includes one or more of the following: an Ethernet protocol, Spanning Tree Protocol, Parallel Redundancy Protocol, EtherCAT, Modbus, or Avionics Full-Duplex Switched Ethernet (AFDX).

5. The system recited in claim 1, wherein the memory is further configured to provide the processor with instructions which when executed cause the processor to: receive, from the first device in an aircraft, a first piece of state information associated with the aircraft; associate a first timestamp with the first piece of state information; receive, from the second device in the aircraft, a second piece of state information associated with the aircraft; associate a second timestamp with the second piece of state information; send, to the controller and via the communication channel with redundancy, the first piece of state information with the first timestamp and the second piece of state information with the second timestamp; and generate an instruction, including by organizing the first piece of state information and the second piece of state information using the first timestamp and the second timestamp.

6. The system recited in claim 1, wherein the memory is further configured to provide the processor with instructions which when executed cause the processor to: receive, from a device in an aircraft, an encoded message; perform decoding on the encoded message, wherein decoding determines a number of errors in the encoded message; and send, to the controller and via the communication channel with redundancy, diagnostic information which includes the number of errors in the encoded message.

7. The system recited in claim 1, wherein the memory is further configured to provide the processor with instructions which when executed cause the processor to: receive, from a device in an aircraft, an encoded message; perform decoding on the encoded message, wherein decoding determines a number of errors in the encoded message; determine if the number of errors in the encoded message exceeds a reporting threshold; and in the event it is determined that the number of errors in the encoded message exceeds the reporting threshold, send, to the controller and via the communication channel with redundancy, diagnostic information which includes the number of errors in the encoded message.

8. The system recited in claim 1, wherein the memory is further configured to provide the s processor with instructions which when executed cause the processor to: receive, from a device in an aircraft, an encoded message; perform decoding on the encoded message, wherein decoding determines a number of errors in the encoded message; and send, to the controller and via the communication channel with redundancy, diagnostic 10 information which includes the number of errors in the encoded message, wherein: at the controller, it is determined if the number of errors in the encoded message exceeds a reporting threshold; and in the event it is determined that the number of errors in the encoded message exceeds the reporting threshold, the controller reports the diagnostic information which is includes the number of errors in the encoded message.

9. A method, comprising:
receiving, from a controller and via a communication channel with redundancy, a first instruction directed to a first device;
sending the first instruction to the first device via a first communication protocol 20 associated with the first device;
receiving, from the controller and via the communication channel with redundancy, a second instruction directed to a second device; and sending the second instruction to the second device via a second communication protocol associated with the second device;
wherein: the first device includes a vertical takeoff and landing lift fan which is configured to rotate about a vertical axis of rotation, is configured to rotate during a vertical takeoff and landing mode, and is configured to be stopped during a forward flight mode; and the second device includes a forward flight lift fan which is configured to rotate about a longitudinal axis of rotation, is configured to be stopped during the vertical takeoff and landing mode, and is configured to rotate during the forward flight mode.

10. The method recited in claim 9 further comprising: receiving, from the first device in an aircraft, a first piece of state information associated with the aircraft; associating a first timestamp with the first piece of state information; receiving, from the second device in the aircraft, a second piece of state information associated with the aircraft; associating a second timestamp with the second piece of state information; sending, to the controller and via the communication channel with redundancy, the first piece of state information with the first timestamp and the second piece of state information with the second timestamp; and generating an instruction, including by organizing the first piece of state information and the second piece of state information using the first timestamp and the second timestamp.

11. The method recited in claim 9 further comprising: receiving, from a device in an aircraft, an encoded message; performing decoding on the encoded message, wherein decoding determines a number of errors in the encoded message; and sending, to the controller and via the communication channel with redundancy, diagnostic information which includes the number of errors in the encoded message.

12. The method recited in claim 9 further comprising: receiving, from a device in an aircraft, an encoded message; performing decoding on the encoded message, wherein decoding determines a number of errors in the encoded message; determining if the number of errors in the encoded message exceeds a reporting threshold; and in the event it is determined that the number of errors in the encoded message exceeds the reporting threshold, sending, to the controller and via the communication channel with redundancy, diagnostic information which includes the number of errors in the encoded message.

13. The method recited in claim 9 further comprising: receiving, from a device in an aircraft, an encoded message; performing decoding on the encoded message, wherein decoding determines a number of errors in the encoded message; and s sending, to the controller and via the communication channel with redundancy, diagnostic information which includes the number of errors in the encoded message, wherein: at the controller, it is determined if the number of errors in the encoded message exceeds a reporting threshold; and in the event it is determined that the number of errors in the encoded message io exceeds the reporting threshold, the controller reports the diagnostic information which includes the number of errors in the encoded message.

14. A computer program product, the computer program product being embodied in a non-transitory computer readable storage medium and comprising computer instructions for:
receiving, from a controller and via a communication channel with redundancy, a first is instruction directed to a first device;
sending the first instruction to the first device via a first communication protocol associated with the first device;
receiving, from the controller and via the communication channel with redundancy, a second instruction directed to a second device; and sending the second instruction to the second device via a second communication protocol associated with the second device;
wherein: the first device includes a vertical takeoff and landing lift fan which is configured to rotate about a vertical axis of rotation, is configured to rotate during a vertical takeoff and landing mode, and is configured to be stopped during a forward flight mode; and the second device includes a forward flight lift fan which is configured to rotate about a longitudinal axis of rotation, is configured to be stopped during the vertical takeoff and landing mode, and is configured to rotate during the forward flight mode.

15. The computer program product recited in claim 14 further comprising computer 30 instructions for: receiving, from the first device in an aircraft, a first piece of state information associated with the aircraft; associating a first timestamp with the first piece of state information; receiving, from the second device in the aircraft, a second piece of state information associated with the aircraft; associating a second timestamp with the second piece of state information; sending, to the controller and via the communication channel with redundancy, the first piece of state information with the first timestamp and the second piece of state information with the second timestamp; and generating an instruction, including by organizing the first piece of state information and the second piece of state information using the first timestamp and the second timestamp.

16. The computer program product recited in claim 14 further comprising computer instructions for: receiving, from a device in an aircraft, an encoded message; performing decoding on the encoded message, wherein decoding determines a number of errors in the encoded message; and sending, to the controller and via the communication channel with redundancy, diagnostic information which includes the number of errors in the encoded message.

* * * * *